(12) United States Patent
McCann

(10) Patent No.: US 12,020,301 B2
(45) Date of Patent: *Jun. 25, 2024

(54) CAMERA-BASED VEHICLE IDENTIFICATION SYSTEM

(71) Applicant: Daniel McCann, Regina (CA)

(72) Inventor: Daniel McCann, Regina (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,414

(22) Filed: Feb. 15, 2023

(65) Prior Publication Data

US 2023/0196423 A1 Jun. 22, 2023

Related U.S. Application Data

(63) Continuation of application No. 16/637,634, filed as application No. PCT/CA2018/050960 on Aug. 7, 2018, now Pat. No. 11,605,234.

(30) Foreign Application Priority Data

Aug. 8, 2017 (CA) .................................. CA 2975721

(51) Int. Cl.
*G06Q 30/06* (2023.01)
*G06F 40/166* (2020.01)
(Continued)

(52) U.S. Cl.
CPC .......... *G06Q 30/06* (2013.01); *G06F 40/166* (2020.01); *G06K 7/10722* (2013.01);
(Continued)

(58) Field of Classification Search
CPC .... G06Q 30/06; G06Q 30/0637; G06Q 20/62; G06Q 20/208; G06Q 20/42;
(Continued)

(56) References Cited

U.S. PATENT DOCUMENTS 8,331,739 B1 12/2012 Abdulkader et al.
2010/0077094 A1 3/2010 Howarter et al.
(Continued)

FOREIGN PATENT DOCUMENTS

AU 2011251660 A9 * 1/2013 ......... G06K 9/00624
CA 2975721 2/2019
(Continued)

OTHER PUBLICATIONS

International Search Report and Written Opinion for PCT/CA2018/050960 dated Nov. 28, 2018, 9 pp.

*Primary Examiner* — Edwyn Labaze
(74) *Attorney, Agent, or Firm* — Neal, Gerber & Eisenberg LLP

(57) ABSTRACT

A vehicle identification system and method incorporating image recognition for retrieval, authentication, and/or notification. The vehicle identification system having a computing structure comprising at least one processor, a tangible computer-readable memory, and a transceiver for communicating over a network. A camera system communicating with the computing structure. The camera system having at least one camera observing at least one vehicle within a camera range of an establishment. The camera system capturing at least one image of the at least one vehicle. The tangible computer-readable memory comprises instructions to configure the at least one processor to: receive image data from the camera system; and detect an identifiable feature of the vehicle within the image data.

16 Claims, 2 Drawing Sheets

(51) Int. Cl.
*G06K 7/10* (2006.01)
*G06K 7/14* (2006.01)
*G06Q 10/0875* (2023.01)
*G06Q 20/20* (2012.01)
*G06Q 20/32* (2012.01)
*G06Q 20/40* (2012.01)
*G06Q 20/42* (2012.01)
*G06Q 30/0601* (2023.01)
*G06V 20/52* (2022.01)
*G06V 20/62* (2022.01)
*G10L 15/22* (2006.01)
*G10L 15/26* (2006.01)
*G06V 30/10* (2022.01)
*H04W 12/63* (2021.01)

(52) U.S. Cl.
CPC ....... *G06K 7/1413* (2013.01); *G06Q 10/0875* (2013.01); *G06Q 20/208* (2013.01); *G06Q 20/3224* (2013.01); *G06Q 20/40155* (2020.05); *G06Q 20/42* (2013.01); *G06Q 30/0637* (2013.01); *G06V 20/52* (2022.01); *G06V 20/62* (2022.01); *G10L 15/22* (2013.01); *G10L 15/26* (2013.01); *G06V 20/625* (2022.01); *G06V 30/10* (2022.01); *G10L 2015/223* (2013.01); *H04W 12/63* (2021.01)

(58) Field of Classification Search
CPC .......... G06Q 20/40155; G06Q 20/3224; G06F 40/166; G06V 20/52; G06V 20/62; G06K 7/1413
USPC ................................ 705/24, 346, 26.1, 26.8
See application file for complete search history.

(56) References Cited

U.S. PATENT DOCUMENTS

| | | | |
|---|---|---|---|
| 2011/0133952 A1* | 6/2011 | McNamara | G08G 1/096775 340/936 |
| 2013/0027227 A1 | 1/2013 | Nordstrom | |
| 2016/0078759 A1* | 3/2016 | Nerayoff | G08G 1/0175 701/3 |
| 2016/0203464 A1* | 7/2016 | Fustes | G07B 15/063 705/13 |
| 2016/0342972 A1 | 11/2016 | Berlin | |
| 2017/0206797 A1 | 7/2017 | Solomon et al. | |
| 2017/0308965 A1* | 10/2017 | Morris | B67D 7/04 |
| 2020/0175525 A1 | 6/2020 | Imai et al. | |
| 2021/0352451 A1 | 11/2021 | Carte et al. | |

FOREIGN PATENT DOCUMENTS

WO WO2000039722 7/2000
WO WO2019028522 2/2019

* cited by examiner

US 12,020,301 B2

CAMERA-BASED VEHICLE IDENTIFICATION SYSTEM

CROSS-REFERENCE

This application is a continuation of U.S. patent application Ser. No. 16/637,634, filed on Feb. 7, 2020, which is a national stage entry of International Patent Application No. PCT/CA2018/050960, filed on Aug. 7, 2018, which claims priority to Canadian Patent Application No. 2,975,721, filed on Aug. 8, 2017. The entire contents of these applications are incorporated herein by reference in their entireties.

FIELD

This invention is in the field of vehicle identification systems and methods, and more specifically to image recognition, and even more specifically to image recognition for retrieval, authentication, and/or notification.

SUMMARY

According to an aspect, there is provided a vehicle identification system comprising: a computing structure having one or more processor(s), a tangible computer-readable memory, and a transceiver for communicating over a network. A camera system may communicate with the computing structure and may have one or more camera(s) observing vehicles within a camera range of an establishment. The camera system may capture one or more image(s) of the vehicle(s). The tangible computer-readable memory comprises instructions to configure the processor(s) to: receive image data from the camera system; and detect an identifiable feature of the vehicle(s) within the image data. The identifiable feature may comprise one or more barcode(s) and/or a license plate.

According to another aspect, the tangible computer-readable memory may comprise instructions to configure the processor(s) to decode the barcode into a unique code.

According to another aspect, the tangible computer-readable memory may comprise instructions to configure the processor(s) to: perform optical character recognition on the license plate to identify at least one alphanumeric character to produce a unique code; and/or identify a region.

The tangible computer-readable memory may comprise instructions to configure the processor(s) to: prompt an operator to enter at least one missing character or region when the optical character recognition fails to identify the at least one alphanumeric character or the region; and/or may provide a point-of-sale (POS) emulator receiving a payment amount and/or a list of purchased goods and services. The computing structure may comprise a global positioning system sensor to determine an establishment geolocation.

In an aspect, the vehicle identification system may comprise a profile server. The tangible computer-readable memory may comprise instructions to configure the processor(s) to: transmit the payment amount, the unique code, the establishment geolocation, and the region to the profile server; receive profile data associated with the unique code and the region from the profile server, wherein the profile data comprises personal data and payment data. The profile server may verify the establishment geolocation is included on a list of approved establishment locations. The profile server may verify the payment amount does not exceed a predetermine threshold for the establishment geolocation prior to transmitting the payment data to the POS emulator. The POS emulator may interface with a POS system to effect a payment of the payment amount using payment data. The profile server may transmits a message to a mobile device associated with the profile data when the profile server determines the payment amount exceeds the predetermine threshold for the establishment geolocation. The message may request authorization from the mobile device to exceed the predetermined threshold. The authorization from the mobile device may be automatic based on a geolocation of the mobile device being within a predetermined distance of the establishment geolocation. The profile server may transmit recommendations based on the profile data and the list of purchased goods and services.

According to another aspect, the computing structure may comprise a server remote from the establishment, a local computer located at the establishment, and/or a local computer located at the establishment and a server remote from the establishment; wherein at least a portion of the instructions configure the local computer and another portion of the instructions configure the server. The processing structure may comprise at least one graphics processing unit. The local computer may comprise a cash register.

According to another aspect, there is provided a method of establishing communication between a vehicle computing system installed in a vehicle and a local order processing system of an establishment. The method may comprise: invoking voice commands using a voice activation control system executing on the vehicle computing system; converting the voice commands into a textual command using a speech-to-text processor executing on the vehicle computing system; receiving GPS coordinates from a GPS receiver communicating with the vehicle computing system; transmitting a customer identification, the textual command, and the GPS coordinates from the vehicle computing system to an order processing server; processing, by the order processing server, the textual command into an establishment data and an order data; locating, by the order processing server, a profile corresponding to the customer identification; querying, by the order processing server, for the establishment from a plurality of establishments based on the GPS coordinates and the establishment data; and comparing the order data to a list of possible order line items to determine at least one order item.

According to another aspect, the method may comprise determining an accuracy for each of the at least one order items; contacting an operator when the accuracy is below an accuracy threshold; and receiving corrections from the operator. The method may comprise transmitting the at least one order items to the vehicle computing system; and displaying the at least one order items on a display of the vehicle computing system. The method may comprise receiving a confirmation that the at least one order items is correct by a user interface on the vehicle computing system; and transmitting a confirmed order from the vehicle computing system to the order processing server. The method may comprise transmitting the confirmed order to the local order processing system.

According to another aspect, the method may comprise capturing at least one image of the vehicle by a camera system located at the establishment; performing image recognition on the at least one image to detect an identifiable feature; perform optical character recognition on the identifiable feature to obtain a unique code and an identifiable region; transmitting the unique code and the identifiable region to a profile server; receiving from the profile server payment data associated with the unique code and the identifiable region; and processing payment using the payment data corresponding to the profile by the local order processing system.

According to another aspect, the method may comprise providing a set of vehicle GPS coordinates to the local order processing system; providing a set of establishment GPS coordinates to the vehicle computing system. The method may comprise mapping, by the vehicle computing system, a route from the set of vehicle GPS coordinates to the set of establishment GPS coordinates. The method may comprise processing payment using payment data corresponding to the profile. The method may comprise transmitting a confirmed order to the local order processing system.

According to another aspect, the method may comprise providing a set of vehicle GPS coordinates to the local order processing system; providing a set of establishment GPS coordinates to the vehicle computing system; and mapping, by the vehicle computing system, a route from the set of vehicle GPS coordinates to the set of establishment GPS coordinates.

According to another aspect, the method may comprise: translating the order data to remove slang and replace the slang with standardized language.

The aspects described herein in any and all combinations.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Typically when a person within a vehicle 102 (e.g. a customer, a driver, etc.) is ordering something from an establishment 150, such as a fast food restaurant, the person places an order and then advances to an payment and order pickup window. These situations may be inconvenient as the person may not have knowledge of how much payment is due or desires to pay with credit or debit cards. The time between when the order is placed and the order pickup window is wasted time for the person. In addition, the time required for payment may also cause delays for other vehicles 102 in line. These delays may significantly impact the number of vehicles that the establishment 150 may process in a given time and therefore may hurt sales. The aspects described herein demonstrate systems and methods of payment that may alleviate the wasted time between order placement and order pickup. Likewise, the drive-through operator has no knowledge of the customer and may not recommend suitable recommendations.

Figure 1:
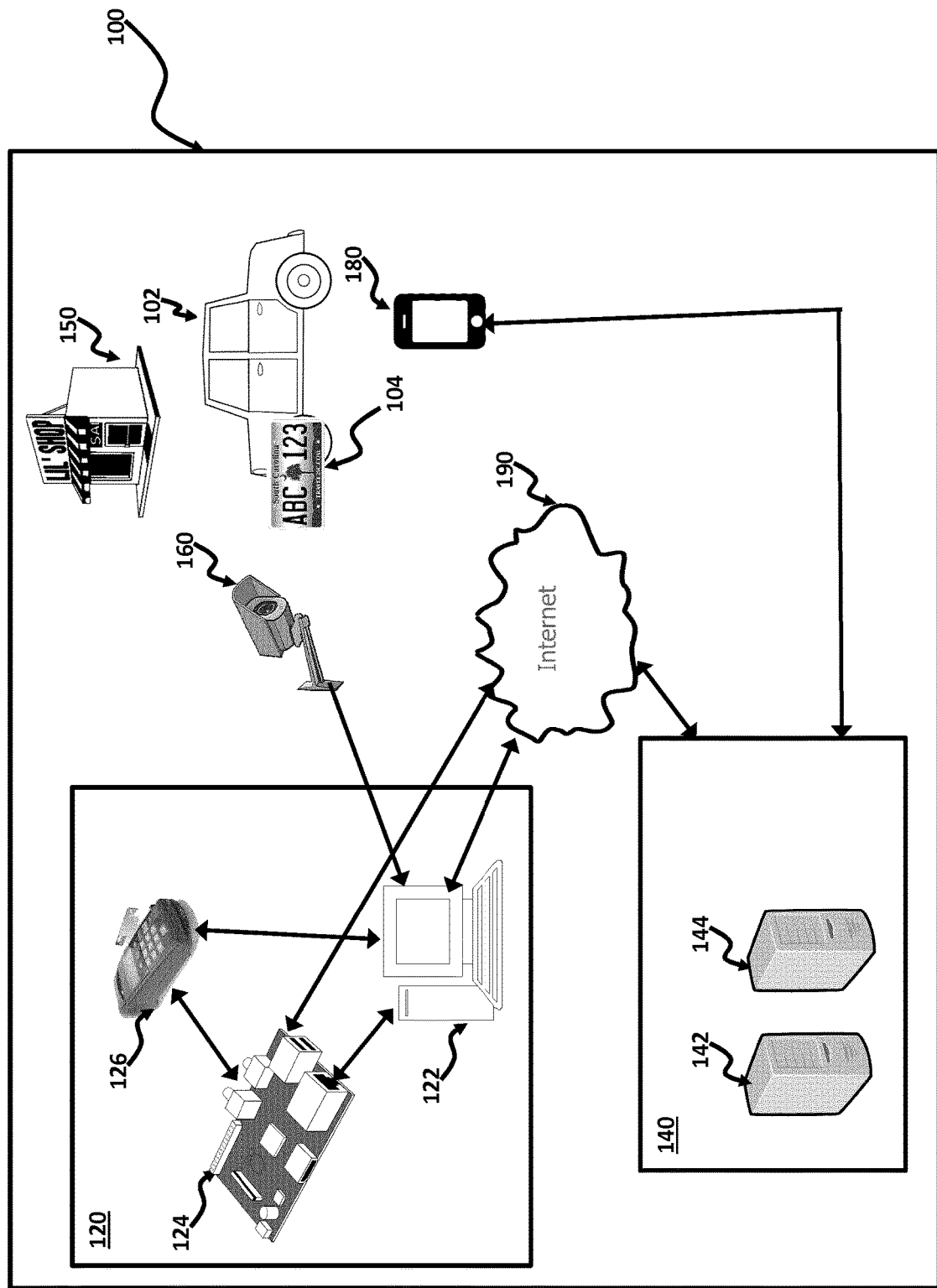
FIG. 1 is a diagram of a computing structure for an image recognition system according to one aspect.

With reference to FIG. 1, there is provided a computing structure 100 that may comprise one or more computing devices 120 for communicating with one or more servers 140 over the Internet 190. The computing devices 120 may comprise one or more processors, a tangible computer-readable memory or medium, supporting electronics (e.g. power supply, communication buses, etc.), and a transceiver for communication over one or more networks, such as the Internet 190. At least one camera systems 160, comprising at least one camera, may communicate with the servers 140 via a local computer 122 located at the establishment 150. The local computer 122 may also be used to perform standard cash register and/or checkout functions. The camera system 160 may capture images or video of one or more vehicles 102 passing through a drive-through of the establishment 150. In other aspects, the vehicles 102 may be passing within camera range of the establishment 150, such as in a parking lot.

The camera system 160 in conjunction with the local computer 122 may capture images or video of the vehicles 102 and may transfer the images or video to a Graphics Processing Unit (GPU) Server 142 or in alternative aspects, processed by the location computer 122. The GPU server 142 may comprise one or more GPUs that process the images or video to detect an identifiable feature of the vehicle 102, such as license plates 104, that appear within the image data. The GPU server 142 may perform optical character recognition on the detected license plates in order to determine a unique code and state/province present on the license plate. In other aspects, the character recognition may be performed on at least one of the local computer 122, the camera system 160, and the servers 140. In yet more aspects, the vehicle owner may place a sticker on the front or the back of the vehicle that may be detectable and/or readable by the camera system 160 and local computer 122, such as a barcode, a 2D barcode. In even more aspects, other heuristics may assist in vehicle identification such as the make, model, colour or using driver identification via facial recognition in the event that the license plate and/or sticker is dirty. In another aspect, the identifiable feature may be read by a reader (not shown) from an RFID, Bluetooth/NFC, or toll booth pass in order to identify the vehicle. The reader may communicate with the local computer 122.

In some aspects, if the computing structure 100 is unable to determine the vehicle identification, the local computer 122 may display a picture of the vehicle 102 to the drive-through operator. The operator may then be prompted to enter one or more missing license plate alphanumeric characters and/or a missing region. The operator may also be provided with an image stored on file of the vehicle so the operator may additionally confirm that the correct vehicle 102 has been identified. In other aspects, the operator may always (or when a certain identification threshold has not been reached) be asked to confirm the identity of the vehicle 102. As an example, the situation where the license plate "A8A XXX" is incorrectly identified as "ABA XXX" could ask for a confirmation. This extra step may allow the operator to confirm the profile is correct before processing the payment. Alternatively, the operator may be presented with the vehicle 102 corresponding to the license plate "A8A XXX" and the vehicle 102 corresponding to the license plate "ABA XXX" and prompt the operator to select the correct vehicle 102.

A point-of-sale (POS) emulator system 124 may receive a payment amount from the establishment's local computer 122. The POS emulator 124 may also determine an establishment geolocation using a global positioning system (GPS) receiver or other location determination systems (not shown). The payment amount and the establishment geolocation may be provided by the POS emulator 124 over a network 190 to a profile server 144 along with the unique code and a region (e.g. state/province). The unique code and state/province may be searched within a database of profiles stored on a profile server 144. If the unique code and state/province combination is found within the database of profiles, the profile server 144 may retrieve profile data comprising personal data and/or predetermined payment data, such as credit card data. The profile server 144 may then verify that the establishment geolocation is contained in a list of approved establishment locations.

In some aspects, a user-facing tablet and/or screen may be installed at the establishment allowing the person making the purchase to view the completion of the purchase. The person may also receive an SMS message and/or an application push notification on the mobile device 180 that provides the person with a record that their payment has been processed. This notification message may be received prior to the person arriving at the pickup window.

In some aspects, the profile server 144 may also verify that the payment amount does not exceed a predetermined threshold for that particular establishment geolocation. If the establishment geolocation and payment amount meets these authentication criteria, the profile server 144 may provide the predetermined payment data to the POS emulator system 124. The POS emulator system 124 may then interface with a POS system 126 located at the establishment 150 to effect the payment of the payment amount. In other aspects, the POS emulator system 124 may directly pay the payment amount without the POS system 126.

If the payment amount exceeds the predetermined threshold for that particular establishment geolocation, the profile server 144 may transmit a short messaging service (SMS) message or other transmission to a mobile device 180 previously associated with the profile data stored on the server 144. The SMS message may request authorization from the mobile device 180 by responding with a confirmation, such as "Yes" or a password. In some aspects, an application executing on the mobile device 180 may automatically approve payment if a geolocation of the mobile device 180 is within a predetermined distance of the establishment geolocation.

In other aspects, the profile server 144 may transmit the profile data comprising personal information and/or predetermined payment data to the local computer 122. The local computer 122 may then verify that the payment amount does not exceed the predetermined threshold for that particular establishment geolocation. If the establishment geolocation and payment amount meets these authentication criteria, the local computer 122 may provide the predetermined payment data to the POS emulator system 124. The POS emulator system may then interface with the POS system 126 to effect the payment of the payment amount.

The predetermined payment data may have been previously provided by the person associated with the license plate data. For example, the person may have previously registered with a profile server 144 and provided credit card data during registration. During registration, the person may have also provided the profile server 144 with at least one establishment (e.g. or on a per-chain basis such as all "Tim Hortons"/"Dunkin Donuts" or on a per-category basis such as "fast food") and/or location (e.g. approved geolocation) where automated payment may be permitted. The person may also review prior purchase data, deactivate certain establishment locations, add additional establishment locations, change payment thresholds for each location, and/or dispute purchases at particular geolocations. The person may also add default orders (e.g. Big Mac with medium fries, large chocolate milkshake), or profile information such as allergies and/or other food preferences.

In some aspects, the local computer 122 (or alternatively the servers 140) may collect information on usual orders by the person and provide product recommendations based on past purchase history at this particular location and/or other locations. The local computer 122 may display these product recommendations and additional upsell items to be added to the order. The drive-through operator may also ask the person if they desire their "usual", which corresponds to their most typical order.

In some aspects, if the unique code and state/province combination is not found within the database of profiles, the POS emulator 124 may prompt the person in the vehicle 102 if they wish to have preauthorized payment at the establishment geolocation. The person may be requested to provide a mobile phone number, payment data (e.g. credit card information, etc.), and/or email address. The POS emulator 124 may then request that the profile server 144 provide the mobile phone number with an SMS message for confirmation.

Figure 2:
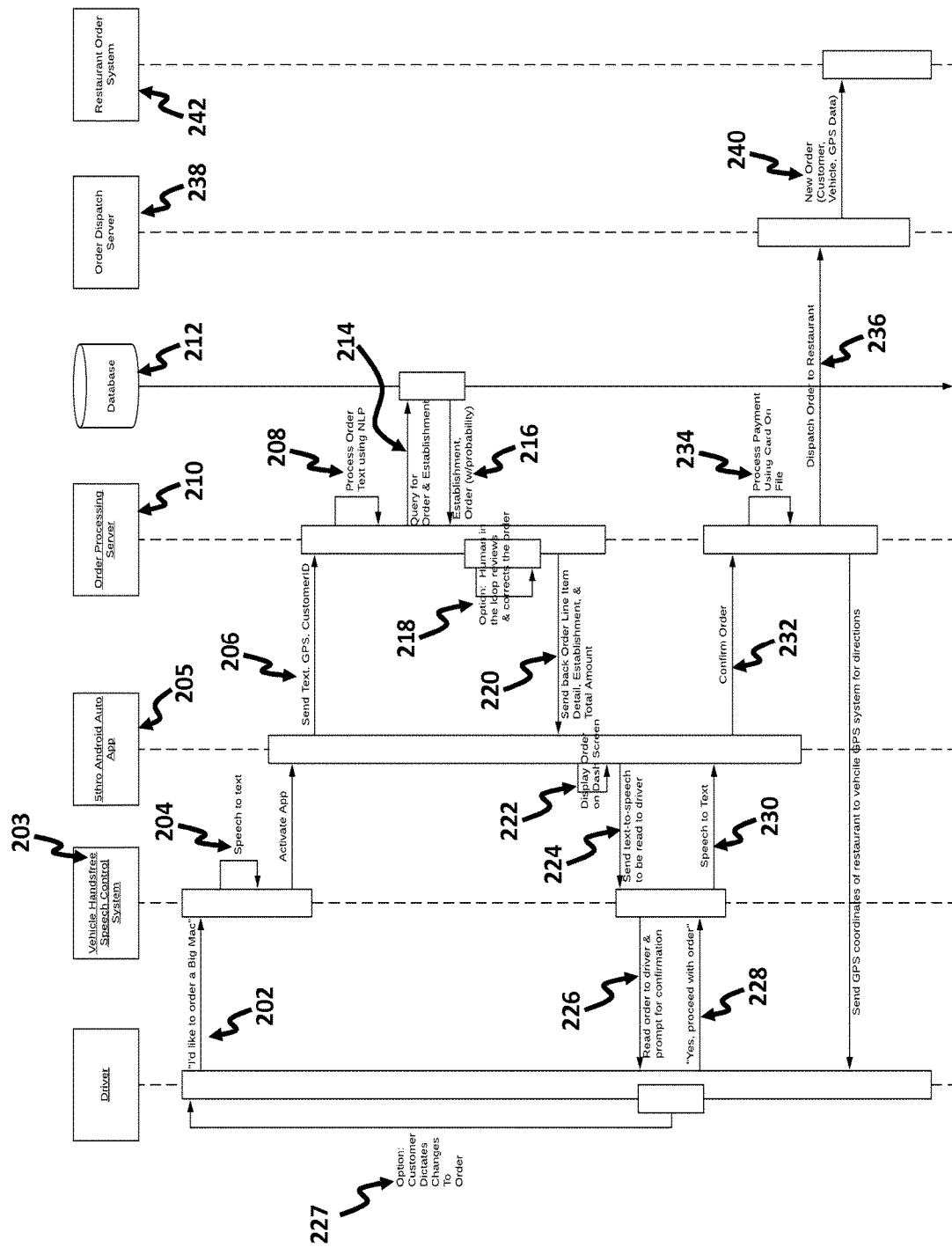
FIG. 2 is a sequence diagram of a vehicle voice ordering system according to one aspect.

According to another aspect, shown particularly in FIG. 2, provides communication between the driver of the vehicle 102 and an operator of the establishment 150 using a hands-free speech system (not shown). For example, the driver of the vehicle 102 may establish communications with a specific establishment 150 by invoking voice commands. The in-vehicle speech control system may autonomously, via speech-to-text and artificial intelligence, receive and place orders as described below, or may directly connect to an operator of the establishment 150 in real-time.

Currently, restaurants make use of order-ahead applications executing on mobile devices 180. In many of these cases, the user may load funds into the application and/or add a credit card to pay for the order ahead of time. This order-ahead application may provide an incentive for a vehicle operator to use the application during driving of the vehicle 102, which is illegal in many jurisdictions and is unsafe. To be safe, the vehicle operator must order while not driving and thereby reducing the likelihood of an impulse purchase caused by a craving while driving.

In this aspect, the driver may issue a voice instruction 202, such as "Order me a Big Mac™ from McDonald's". In another example, the driver specifies "Order me a large double-double coffee from Tim Hortons". A voice activation control system 203 executing on the processor of the mobile device 180, such as Siri or Google Assistant voice control, (or a vehicle processor) may perform speech-to-text processing 204 to convert the speech into a textual command. The voice activation control system 203 may comprise a microphone for receiving verbal commands from the driver.

Based on the verbal command, the voice activation control system 203 may activate an Android Auto or Apple CarPlay application 205 installed on a computer system in the vehicle 102. Alternatively, the mobile device 180 may active an application 205 executing on the processor of the mobile device 180. The text-to-speech processing 204 may be performed by the computer system in the vehicle 102, the mobile device 180, and/or a cloud-based server connected to the Internet 190.

The application 205 may determine the establishment 150 referenced in the textual command and determine a product or a service being ordered. At step 206, the application 205 transmits the textual command along with the GPS coordinates, and/or a customer identification to an order processing server 210 (or the profile server 144) that may be located on the Internet 190 and/or may be located at the establishment 150. The order processing server 210 comprises a natural language processor 208 that may process the textual command into a selected establishment 150, and order data. A heuristic system, which may include machine learning and/or artificial intelligence, may parse and translate the order data into one or more line items comprising an order. For example, the order data may be translated to remove slang (e.g. "order me a frocho skinny half-caf" where "frocho" means frozen chocolate, "skinny" means skim milk, and half-caf means half decaffeinated). The customer identification may be used to query a database to identify one of the profiles stored on the profile server 144, which may contain a credit card on file and/or metadata about the customer, such as order history, etc.

The order processing server 210 may then query a database 212 using the GPS coordinates and the establishment from the textual command to determine the establishment 150 and the order data at step 214. The order data may be compared to a list of possible order line items to determine one or more order items. The database 212 responds with the establishment 150 and an order along with a probability that the order is accurate at step 216.

If the probability of the order accuracy is below an accuracy threshold (e.g. due to a thick accent, background noise, and/or other reason), an operator may be contacted in order to review and correct the order at step 218. The operator may be a person at the establishment 150, a person located at a third party location, and/or located at the server 210. In some aspects, the driver of the vehicle 102 may be provided with a list of potential matches that were transmitted from the server 210 to the application 205 and ask the customer to confirm a correct order item from the list of potential matches. In another aspect, the customer may be prompted by the application 205 to clarify the order by repeating the order. In another aspect, the customer may cancel the order using the application 205.

When the order is correct, a confirmed order may be transmitted back to the application 205 at step 220. The confirmed order may comprise one or more lines items, details, the establishment 150 selected, and a total amount. The confirmed order may be presented on a display of the vehicle 102 by the application 205 at step 222 and/or converted to audio data using a text-to-speech system to be read to the driver at step 224. The driver may be prompted for confirmation at step 226. The driver may then dictate changes to the order at step 227.

The driver may then confirm within the application 205 using a verbal confirmation, and/or clicking a physical or virtual button at step 228. If the verbal confirmation is given, speech-to-text processing may be performed at step 230. In response, the application 205 may transmit a confirm order message 232 to the order processing server 210. The order processing server 210 may then process the payment using the payment data, such as credit card data, contained in the profile at step 234. In another aspect, the driver may be asked to confirm the order and indicate what payment data should be used (e.g. pay for the order via credit card stored on file, or some other manner). In another aspect, the payment data may be processed by the local computer of the establishment as described above with reference to FIG. 1.

Once the payment has been processed, the confirmed order may be transmitted to the establishment 150 from the order processing server 210 using an order dispatch server 238 at step 236. The order dispatch server 238, which may be located in a cloud server or on premise of the establishment 150, may look up the customer information associated with the ordering customer from the profile server 144, process the payment for the order, and/or send the order to a local order processing system 242 at the establishment 150. In some aspects, the order dispatch server 238 may provide a set of vehicle GPS coordinates to the local order processing system 242. In some aspects, the order dispatch server 238 may provide the application 205 with communication data in order for the application 205 to transmit the set of vehicle GPS coordinates directly to the local order processing system 242.

According to some aspects, the order processing server 210 may provide the application 205 with a set of establishment GPS coordinates. The application 205 may then present a GPS map on the display of the vehicle 102 and/or provide turn-by-turn directions to the set of establishment GPS coordinates.

When the vehicle 102 arrives at the establishment 150, the vehicle 102 may be identified via either (or both) of GPS coordinates, Bluetooth signaling, and/or a scan of the license plate as described above with reference to FIG. 1. Since payment may have been processed ahead of time, the customer may not be required to pay.

According to another aspect, the order processing server 210 may autonomously recommend personalized upsell opportunities to the customer by transmitting these suggestions to the application 205 prior to submitting the order to the order dispatch server 238.

According to another aspect, the order processing server 210 may connect the application 205 with the identified establishment 150. The connection may comprise a two-way voice communication system such as WebRTC or Skype. In some aspects, the two-way voice communication system may replace the drive-through speaker/microphone system. The display within the vehicle 102 may present a menu similar to a drive-through menu in which the driver may order. This aspect may be advantageous during inclement weather, such as rain, severe cold, etc.

Although the aspects described herein demonstrate the at least one camera system 160 communicating with the servers 140 via the local computer 122 at the establishment, other configurations are possible. For example, the local computer 122 may be incorporated within the at least one camera system 160 as a self-contained unit. In other examples, only one local computer 122 may be incorporated within a master camera system 160 and additional slave cameras may transmit their images to the master camera system 160. In yet other aspects, the at least one camera system 160 may directly communicate with the servers 140 without a local computer 122.

Although the aspects described herein are directed to a drive-through, the aspects described herein may also apply to car washes, oil changes, automotive shops, parking lots or garages (e.g. parkades), entertainment venues (e.g. amusement parks, state parks, provincial parks, national parks, etc.), toll booths, gas stations, and/or any other venue or establishment where payment may be required while in a vehicle.

Although the aspects described herein demonstrate camera recognition, other aspects may comprise a Bluetooth™ beacon emitted by the mobile device 180 to a Bluetooth receiver within the establishment further providing payment data. Alternatively, the establishment may emit the Bluetooth beacon, which is received by the mobile device 180. In another aspect, a GPS proximity may be used in order to determine if the vehicle is within a range of the establishment.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A vehicle identification system comprising:
a computing structure comprising at least one processor, a tangible computer-readable memory, and a transceiver for communicating over a network;
a camera system communicating with the computing structure; the camera system having at least one camera observing at least one vehicle within a camera range of an establishment; the camera system capturing at least one image of the at least one vehicle;
a global positioning system sensor to determine an establishment geolocation; and
wherein the tangible computer-readable memory comprises instructions to configure the at least one processor to:
receive image data from the camera system;
detect an identifiable feature of the vehicle within the image data;
provide a point-of-sale (POS) emulator receiving a payment amount and a list of purchased goods and services;
transmit the payment amount, the unique code, the establishment geolocation, and the region to a profile server; and
receive profile data associated with the unique code and the region from the profile server, wherein the profile data comprises personal data and payment data.

2. The vehicle identification system according to claim 1, wherein the identifiable feature comprises at least one of a barcode and a license plate.

3. The vehicle identification system according to claim 2, wherein the tangible computer-readable memory comprises instructions to configure the at least one processor to:
decode the barcode into a unique code.

4. The vehicle identification system according to claim 2, wherein the tangible computer-readable memory further comprises instructions to configure the at least one processor to:
perform optical character recognition on the license plate to identify at least one alphanumeric character to produce a unique code; and
identify a region.

5. The vehicle identification system according to claim 4, wherein the tangible computer-readable memory further comprises instructions to configure the at least one processor to:
prompt an operator to enter at least one missing character or region when the optical character recognition fails to identify the at least one alphanumeric character or the region.

6. The vehicle identification system according to claim 1, wherein the tangible computer-readable memory further comprises instructions to configure the at least one processor to:
transmit a loyalty program information to the profile server; and
receive profile data associated with the loyalty program information, wherein the profile data comprises personal data and payment data.

7. The vehicle identification system according to claim 6, wherein the tangible computer-readable memory further comprises instructions to configure the at least one processor to:
record the payment amount and the list of purchased goods and services in association with the loyalty program information.

8. The vehicle identification system according to claim 6, wherein the tangible computer-readable memory further comprises instructions to configure the at least one processor to:
adjust the payment amount and the list of purchased goods and services in association with the loyalty program information.

9. The vehicle identification system according to claim 8, wherein said adjust the payment amount and the list of purchased goods and services in association with the loyalty program comprises adding a coupon based on the loyalty program.

10. The vehicle identification system according to claim 1, wherein the profile server verifies the establishment geolocation is on a list of approved establishment locations.

11. The vehicle identification system according to claim 1, wherein the profile server verifies the payment amount does not exceed a predetermine threshold for the establishment geolocation prior to transmitting the payment data to the POS emulator.

12. The vehicle identification system according to claim 11, wherein the profile server transmits a message to a mobile device associated with the profile data when the profile server determines the payment amount exceeds the predetermine threshold for the establishment geolocation and the message requests an authorization from the mobile device to exceed the predetermined threshold.

13. The vehicle identification system according to claim 12, wherein the authorization from the mobile device is automatic based on a geolocation of the mobile device being within a predetermined distance of the establishment geolocation.

14. The vehicle identification system according to claim 1, wherein the POS emulator interfaces with a POS system to affect a payment of the payment amount using payment data.

15. The vehicle identification system according to claim 1, wherein the profile server transmits a recommendation based on the profile data and the list of purchased goods and services.

16. The vehicle identification system according to claim 1, wherein the computing structure comprises a server remote from the establishment.

* * * * *